June 13, 1950 H. PREHN 2,511,007
COVER FOR SHIP HATCHES
Filed Dec. 23, 1944 5 Sheets-Sheet 2

INVENTOR
Henri Prehn
BY
Henry J. Lucke
ATTORNEY

June 13, 1950 H. PREHN 2,511,007
COVER FOR SHIP HATCHES.
Filed Dec. 23, 1944 5 Sheets-Sheet 3

INVENTOR
Henri Prehn
Henry J. Lucke
ATTORNEY

June 13, 1950  H. PREHN  2,511,007
COVER FOR SHIP HATCHES
Filed Dec. 23, 1944  5 Sheets-Sheet 5

INVENTOR.
Henri Prehn
BY Henry J. Lucke
ATTORNEY

Patented June 13, 1950

2,511,007

UNITED STATES PATENT OFFICE 2,511,007

COVER FOR SHIP HATCHES

Henri Prehn, Roslyn, N. Y.

Application December 23, 1944, Serial No. 569,461

23 Claims. (Cl. 114—202)

The invention relates to covers for ship hatches.

In general, the invention relates to ship hatch covers of 'tween decks and weather decks and generally of the pontoon type; the component sections of the hatch cover are arranged when in hatch closing position to substantially abut one another at their juxtaposed edges and are suitably mounted to be shifted in sucession from their hatch-closing position and stowed in face-to-face vertical position. The cover sections may be stowed as preferred: they may be stowed partwise at the respective ends of the hatch or all the sections may be stowed at one end of the hatch, or otherwise.

More particularly, the hatch cover comprises a plurality of individual cover sections arranged when in closing position in seriatim edge-to-edge engagement, and when in closed position are adapted to be individually supported in stable relation to the coaming of the hatch. Preferably, each cover section is provided with wheels arranged to ride upon track rails to facilitate movement of the section to and from its vertical stowed position. In such wheel-provided embodiments of the invention, the cover sections are equipped with suitable means applicable when in normal closing position to support the cover sections in stable relation to the body of the ship independently of their wheels.

Such stable supporting means is preferably in the form of bolts or equivalent carried by the respective sections and arranged to be projected relative to the sections to engage a suitable support in fixed relation to the deck of the ship. When thus supported, the hatch cover sections may serve as a support for the stowage of cargo. Most preferably such bolts or equivalent, when moved to projected position, elevate the cover sections to thereby free the sections from support by their wheels. Advantageously, the track rails are employed for the support of the bolts. When retracted, the bolts or equivalent are shifted within the contour of the sections, accompanied by downward bodily movement of the sections whereby their wheels are brought into engagement with the track rails.

Desirably, each section is arranged when supported by its wheels to tilt upwardly at its one end, whereby when the section is shifted to the end of the hatch opening at which it is to be stowed, its movement to full vertical stowed position is facilitated. When in vertical stowed position, the cover sections are locked in mutual face-to-face engagement.

Further features and objects of the invention will be more fully understood from the following detailed description and the accompanying drawings, in which

Fig. 12 is also a sectional view taken on line 12—12 of Fig. 13.

Figures 1, 2:
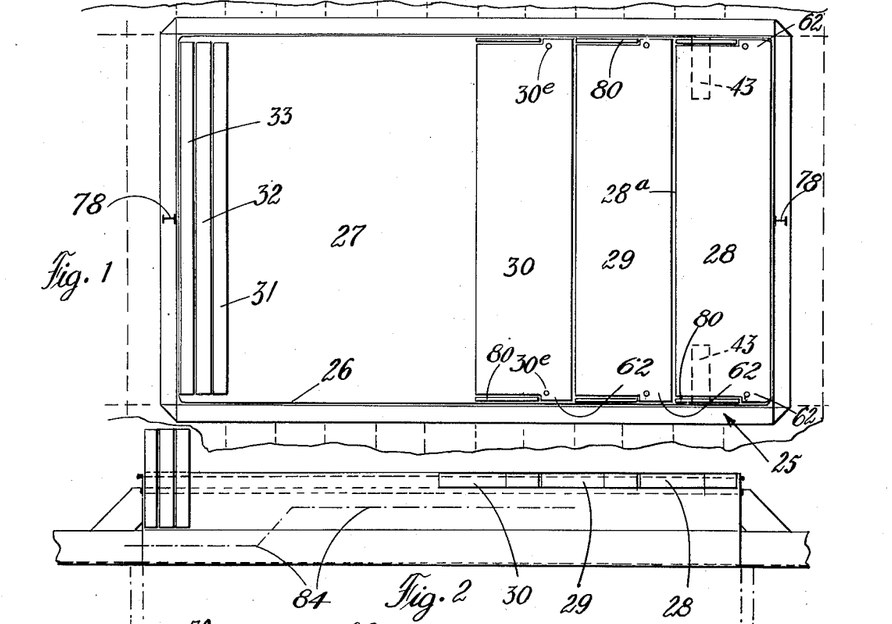
Fig. 1 is a diagrammatic plan view of a pontoon type of hatch cover sections pursuant to the invention. In the illustrated embodiment a total of six sections is indicated, three of which are shown in vertical stowed position at, say, the aft end of the hatch opening; the remaining three sections are shown in normal closing position. As is set forth more fully hereinafter, the three cover sections shown in closing position are arranged to be stowed at the forward end of the hatch.
Fig. 2 is a side elevation of Fig. 1.
Figures 3, 4, 5:
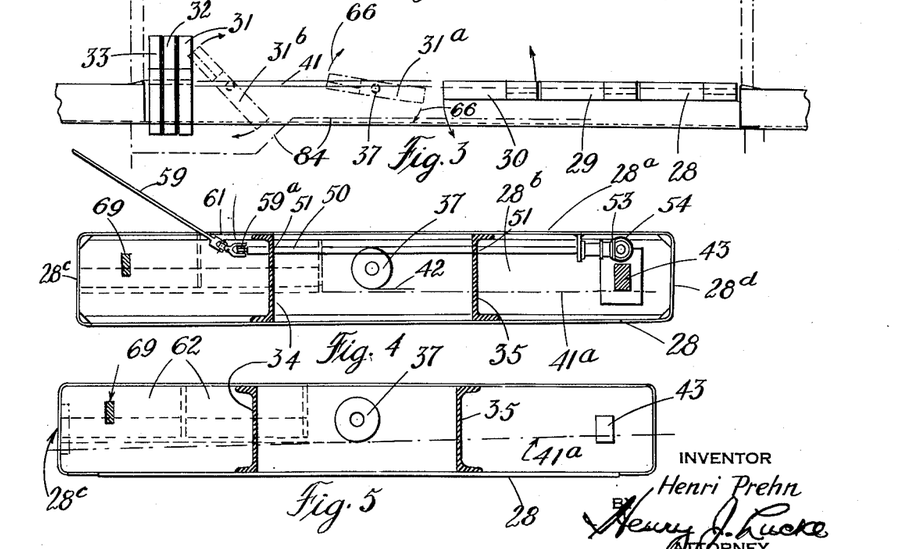
Fig. 3 is a diagrammatic side elevation similar to Fig. 2, but indicating in dot-and-dash outlines the sequential movement of one cover section to its stowed position, shown in full outline. The dot-and-dash line below the deck level of the hatch opening indicates the height to which cargo may be stowed in the lower deck.
Fig. 4 is a side elevation, on an enlarged scale, of a cover section shown in Fig. 1. This view indicates also one form of mechanism carried by the section and operable manually by means of a wrench or equivalent for shifting the support of the section from its wheels to its bolts or equivalent, and vice versa. In this view the section is shown with its indicated wheel elevated with respect to the track rail.
Fig. 5 is a side elevation similar to Fig. 4, but showing the indicated wheel of the cover section resting upon the track rail.
Figure 6:
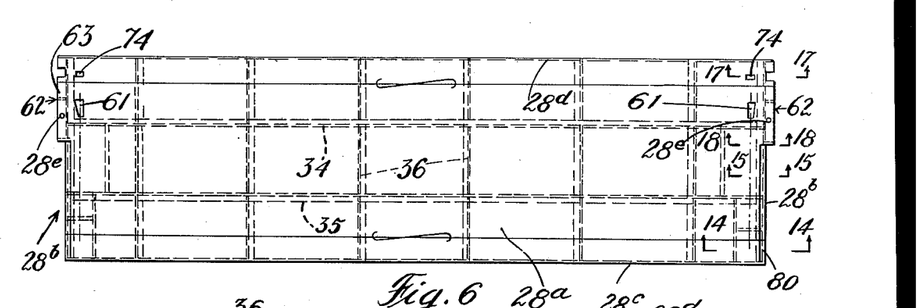
Fig. 6 is a top plan view of a preferred form of an individual cover section.

Referring to the drawings, and in particular to the hatch construction illustrating a 'tween deck hatch, 25 represents the brow-plate structure, and 26 the hatch coaming. 27 indicates the opening of the hatch. In Figs. 1, 2 and 3, in particular, six cover sections are illustrated as constituting a pontoon type hatch cover section for the opening 27; these six cover sections are respectively designated 28, 29, 30, 31, 32 and 33.

Sections 28, 29 and 30 are shown in closing position and sections 31, 32 and 33 in vertical position, stowed, say, at the aft end of the hatch opening. When the cover sections 31, 32 and 33, and also the sections 28, 29 and 30, are in their respective closing positions, the hatch opening 27 is fully closed. When in closing position the contiguous edges of the successive adjoining sections are in immediate edge-to-edge engagement.

Fig. 3 illustrates generally the path of shifting a cover section to its stowed position. In particular, Fig. 3 illustrates the movement of shift of the cover section 31 from its horizontal closing position to an intermediate position, indicated at 31a in dot-and-dash outline, then to a subsequent intermediate position 31b, also shown in dot-and-dash outline; the latter named intermediate position is indicated as approaching its vertical, i. e., stowed position, shown in full outline. The arcuate arrows appended to the intermediate position 31a indicate a restricted bodily rotational or tilting movement of the cover section 31 in its transit of shift along the track rails. The arcuate arrows appended to the section 31 at its stated subsequent position, 31b, indicates a free bodily rotational movement of the cover section 31 toward and to the vertical, at the stage toward and at its vertical stowed position.

Figure 12:
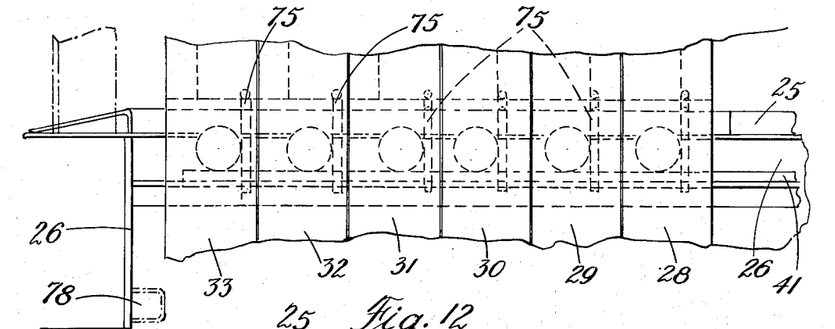
Fig. 12 is a detail elevational view, on an enlarged scale, of six cover sections (shown broken away at their upper and lower portions) in vertical mutual face-to-face engagement, all stowed at one end of the indicated hatch opening.
Figure 13:
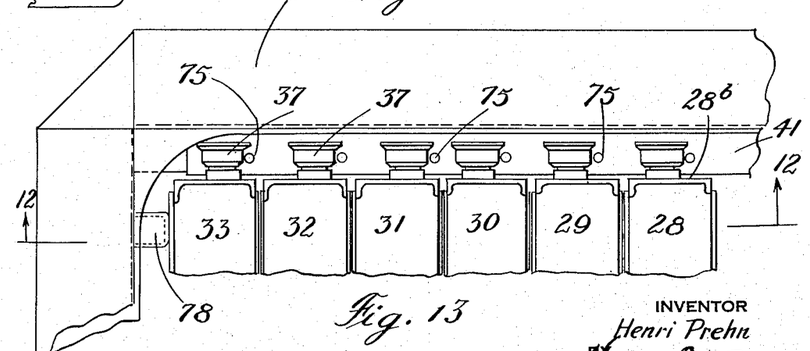
Fig. 13 is a detail top plan view of a corner portion of a typical hatch, showing the upper end portions of six cover sections stowed in vertically face-to-face positions. This view shows the wheels of the sections locked with respect to the indicated track rail by means of drop pins.

Figs. 12 and 13 indicate the six cover sections, numbered 28, 29, 30, 31, 32, 33, similarly as above, but in this instance showing all of the sections stowed in vertical position, at one end of the hatch.

Each cover section, as appears from Figs. 4, 5, 6, 7 and 8, selecting the cover section 28 as typical, is hollow-formed. As shown, the cover section has a top plate, designated 28a, opposite side plates 28b, aft plate 28c and forward plate 28d. These plates are suitably contoured, and seam-welded at their respective abutting edges. Internally of the section are reinforcing members 34, 35, see Figs. 5, 6 and 7, which serve as stiffeners extending from the opposite side plates 28b, and are preferably welded in position. Internally of the cover section, also, are additional stiffening members, shown in Figs. 6, 7 and 8, and designated 36, which extend transversely of the reinforcing members 34, 35, from the aft plate 28c to the opposite forward plate 28d, and intermediate the reinforcing members 34, 35. Steel serves as excellent material for these parts. As appears from Figs. 7 and 8, the cover section may not be fully closed at its bottom.

Suitable means are provided for facilitating the shifting of each section from its horizontal closing position to its vertical stowed position, and conversely from vertical stowed position to horizontal closing position. Such shift-facilitating means includes wheels or shoes 37 for the respective sections. As appears from Figs. 12 and 13 and also Figs. 4 and 5, two wheels 37 are provided for each cover section. These wheels are suitably mounted at the respective opposite ends of the cover section, on shafts which are in substantial alignment.

Figure 11:
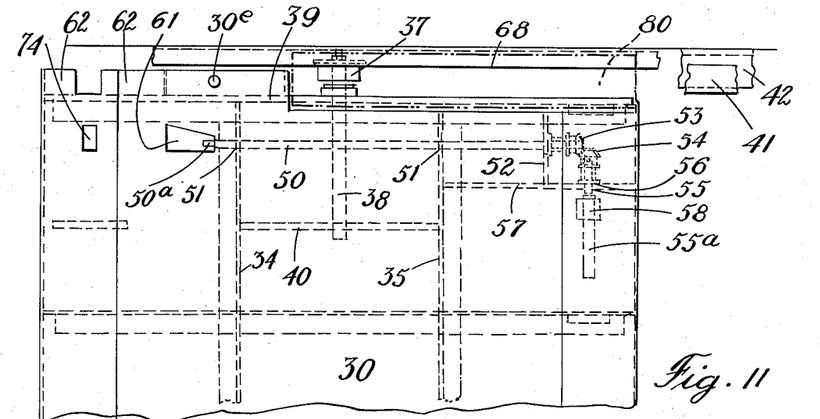
Fig. 11 is a detail top plan view of a side portion of a cover section, enlarged in scale as compared with Fig. 6.

As shown in Fig. 11, each wheel 37 is mounted on a stub shaft 38 which is supported within suitable openings in a side plate 28b, and in a supporting member 40. The wheel 37 may be rigidly secured to the shaft 38 and a bearing provided for the shaft 38 at the stated openings, or the shaft 38 may be fixedly secured within the stated openings and a bearing provided between the wheel 37 and such shaft 38.

Two rails 41 serve as a track for the wheels; such track rails may be suitably secured, see Figs. 14, 15, 16 and 17, to opposite inner sides of the coaming 26 of the hatch opening; a bracket of the character indicated at 42 in Figs. 14 through 18, welded to such sides of the coaming, may serve to support the respective rails 41. Each wheel 37 is preferably provided with a rim 37a, to insure proper retention of the wheels 37 with respect to the track rails 41, serviceable also under conditions of list or high sea.

Figure 7:
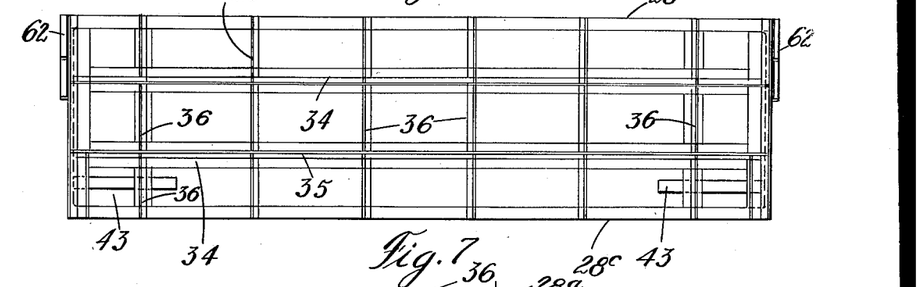
Fig. 7 is a bottom view of Fig. 6, indicating that the cover section need not be closed by a bottom plate.
Figure 8:
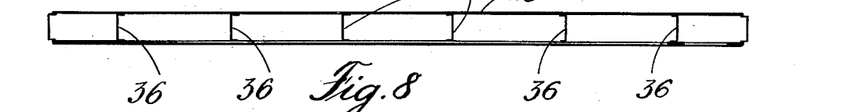
Fig. 8 is a central transverse sectional view of Fig. 6.
Figures 14, 15, 16, 17, 18, 19:
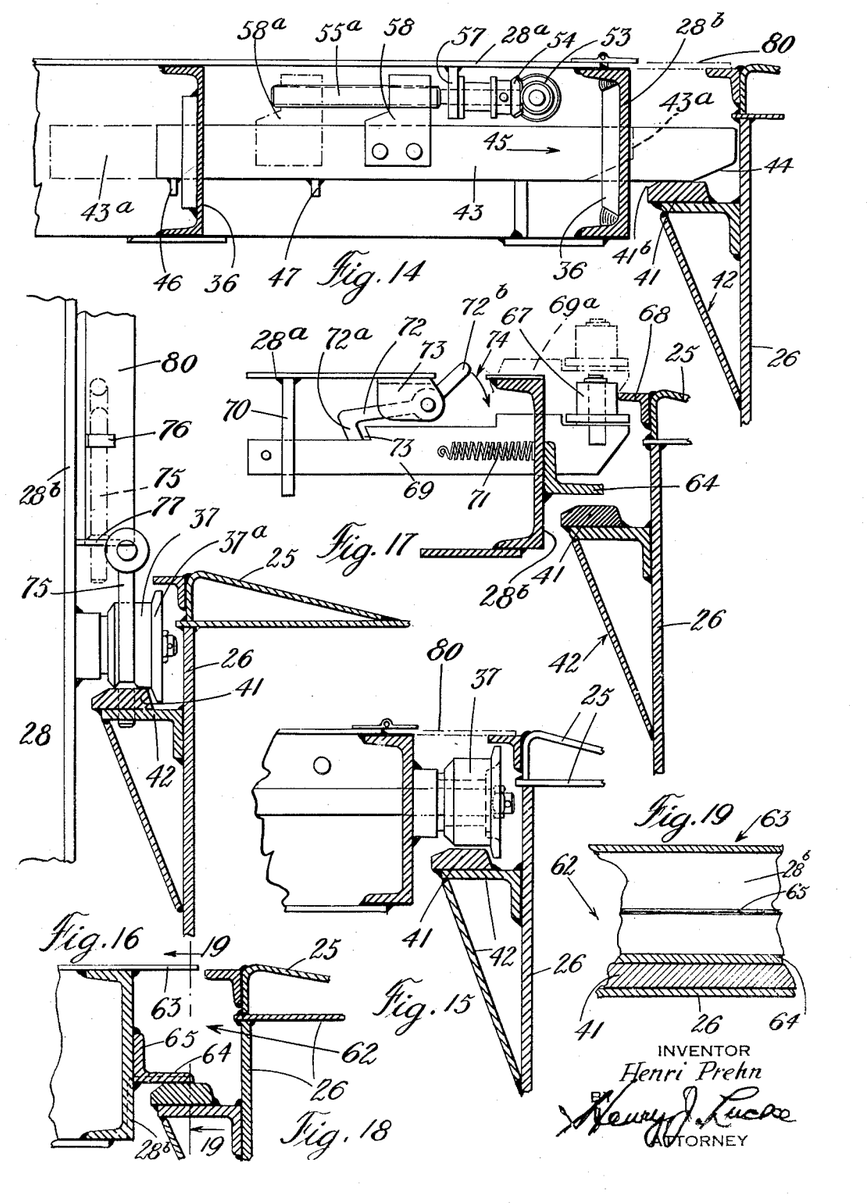
Fig. 14 is a detail sectional view, on an enlarged scale, taken on line 14—14 of Fig. 6 and shows a supporting bolt and the mechanism for operating the same.
Fig. 15 is a detail elevational view on line 15—15 of Fig. 6, on an enlarged scale. This view indicates the cover section in normal closing position, its indicated wheel being elevated relative to the track rail. The view also indicates the coaming of a 'tween deck hatch.
Fig. 16 is a detail sectional view corresponding to that of Fig. 15, but showing the wheel of the cover section resting upon the track rail and the cover section elevated to vertical position and its lock pin inserted in section locking relation.
Fig. 17 is a detail sectional view on an enlarged scale, taken on line 17—17 of Fig. 6, showing the safety catch and its guide roller and the mechanism for the same.
Fig. 18 is a detail sectional view on line 18—18 of Fig. 6. This view shows one form of overhang extension, provided at opposite sides at one end portion of the section, serving by its overweight to tilt such end portion of the section downwardly, to thereby elevate the opposite end portion (at which the bolts are located), to thereby preclude inadvertent engagement of the ends of the bolts with the track rails during the stage of transit of the section on the rails, and to insure freedom of movement of the bolts when projected, at the stage of shifting of the cover section from wheel-support to bolt-support.
Fig. 19 is a detail sectional view on line 19—19 of Fig. 18.

Specifically, as shown in Figs. 11 and 14 of the drawings, mounting means suitable for the stated reciprocation of each bolt 43, comprises suitable openings in the concerned side plate 28b and thereto adjacent intermediate stiffening member 36, for guiding and positioning such bolt. Fig. 14 indicates in full outline the projected position of the bolt 43, i. e., resting fully upon the upper surface of the track rail 41; the retracted position of the bolt 43 is indicated by the dot-and-dash outline 43a. Desirably, a limit stop 46, secured to the under face of the bolt 43, cooperates with the indicated stiffening member 36 to preclude undue extension of projection of the bolt 43, and a limit stop 47 also secured to the under face of the bolt similarly serves to restrict the inward retracting movement of the bolt 43. Two bolts 43, see Figs. 1 and 7, are provided for each cover section and are arranged to project in opposing directions at the opposite sides 28b, 28b of the cover section and are located toward one end portion of the section, namely, in the plane indicated by the section line 14—14, shown in Fig. 6.

Power means for projecting and retracting the respective pairs of bolts 43, 43, of a cover section, are illustrated in Figs. 11 and 14, and as shown comprises a main driving shaft 50 journaled in suitable openings 51, 51, see Fig. 11, in the stiffening plates 34, 35, and in a bearing bracket 52. To the end of the shaft 50 is secured the bevel gear 53 which meshes with the bevel gear 54, secured to the shaft 55 which passes through the bearing opening 56 in the bearing bracket 57. The shaft 55 is provided with square threading at its free end 55a, meshing with the threading of the nut 58 which is secured to the bolt 43. Fig. 14 indicates the nut 58 positioned when the bolt 43 is projected; the dot-and-dash outline 58a indicates the position of the nut corresponding to the retracted position 43a of the bolt 43.

Figure 9:
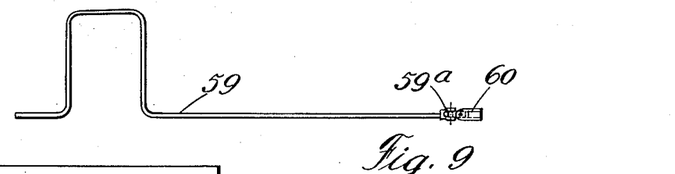
Fig. 9 is an elevation of an applicable type of universal socket wrench for manually shifting a cover section from wheel to bolt support, and vice versa.
Figure 10:
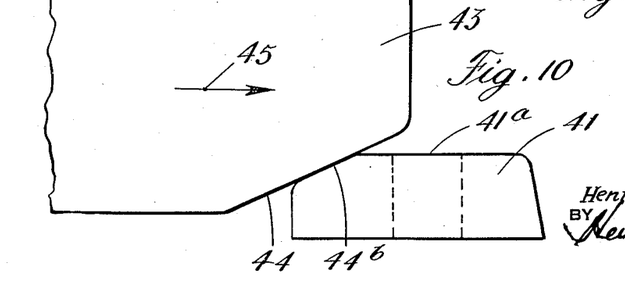
Fig. 10 is a diagrammatic view on an enlarged scale, of the tapered end of a bolt and its relation to one rail of the track; the bolt is shown at an intermediate stage of "riding" of its tapered lower face upon the correspondingly tapered side face of a track rail in the transit of the bolt to its position of full support upon the upper surface of the track rail.

Application of power to the driving shaft 50 is indicated in Fig. 4, in this instance manually applied by means of a universal wrench 59, see Fig. 9, having a socket 60, adapted to engage the squared end 50a of the bolt-operating shaft 50. The opening 61 in the top plate 28a affords access of the wrench to the shaft end 50a. The universal joint is indicated at 59a.

As shown in the drawings, each bolt of any individual cover section is power-operated individually, and accordingly it is advantageous when shifting a cover section from bolt-support to wheel-support, and conversely, to concomitantly operate both bolt-shifting mechanisms. It is apparent that the bolts of any section may be mechanically coupled to afford simultaneous operation and that a mechanical drive, in lieu of manual operation, may be employed.

In Figs. 4 and 5, the dot-and-dash line 41a indicates the horizontal, and the distance between the line 42 in Fig. 4 from the horizontal line 41a indicates the extent of elevation of the section from its wheel-supported position to its bolt-supported position.

Cooperating with the bolts 43, 43, in the support of the section when not supported by its wheels 37, 37, are overhang extensions designated generally 62, 62. Figs. 4, 5, 6, 7, 18 and 19 illustrate the overhang extensions 62, 62, which are arranged at the opposite sides of each cover section at its end opposite to that adjacent which the bolts 43, 43, are located. One overhang extension 62 is also shown in Fig. 11.

Such overhang extension, as shown, comprises a top plate 63 which extends sidewise from the top plate 28a of the section 28, and may be integral therewith; also a lowerly disposed plate 64, which, as appears from Figs. 18 and 19, may be the horizontal member of a bracket 65, indicated as welded to the side plate 28b of the section.

The plates 64, 64, of each cover section cooperate with the bolts 43, 43, in the support of the section (when it is not supported by its wheels 37, 37), by engagement upon the upper faces of the track rails 41, 41, respectively.

When it is desired to shift a cover section to its stowed position, the bolts 43, 43, are withdrawn, as referred to above. For the purpose of controlling the extent of tilt of each cover section in its movement toward stowed position, see Fig. 17, rimmed rollers 67, 67, one at each of the opposite sides of the cover section are provided which cooperate with the angle plates 68, 68, respectively, and are secured at the opposite inner faces of the brow-plate structure 25. Each roller 67 is carried by a safety catch 69 which is reciprocally mounted within the cover section, cover section 28 being indicated in Fig. 17, in a suitable opening in the side plate 28b and an opening in the bracket 70, which is secured to the under face of the top plate 28a of such section 28. The retractable spring 71 serves to bias the safety catch 69 in its projected position, to bring the rim of the roller 67 in operative relation with the under face of the angle plate 68. The pawl 72, suitably pivoted on its bracket 73 to the under face of the top plate 28a of the cover section is over-weighted to bias its hooked end 72a under gravity into the notch 73 of the safety catch 69, when the safety catch is in its projected position.

Rimmed rollers 67, by their engagement with angle plates 68 prevent accidental tilting of the cover section after bolts 43 are withdrawn either accidentally or intentionally. Positive actuation of pawl 72 is required to release rimmed rollers 67 from engagement with angle plates 68 before the cover section can be manually moved to vertical position.

As indicated above, each cover section is over-weighted at its end portion at which its extensions are located, for the purposes of elevating, i. e., tilting the opposite end portion of the cover section at which its bolts are located to bring the bolts 43 in alignment with track 41 preparatory to the projection of said bolts.

The shifting of a cover section along the track rails is typified in Fig. 3 by the cover section 31. Such shifting may be accomplished manually by engaging the hook ends of ropes or chains in the opening 30e, one opening 30e being shown in Fig. 11 with respect to the cover section 30, and dragging such section along the track, see Figs. 1 and 6, at each side of the section. The openings 28e of the section 28, and similarly denoted openings of the other cover sections, serve like purposes.

When the cover section approaches its position at 30, indicated in Fig. 3, the exposed ends 72b of the pawls 72 are depressed through the openings 74 (in the top plate of the cover section), thereby freeing their hooked ends 72a from engagement with the notches 73 of the safety catches 69, and kicking or otherwise pushing the rollers 67, 67 toward the cover section, accompanied by lifting up the overhang-embracing end portion of the cover section whereupon the bolt-embracing end of the cover section is forced downwardly, as indicated in Fig. 17 by the elevated dot-and-dash outline 69a depicting the elevation of the safety-catch 69 and its roller 67. The cover section is thus free to assume full vertical position and may be pushed while supported by its wheels 37, to its proper stowed position. When attaining its stowed vertical position, it may be locked as by means of headed pins 75, as indicated in Figs. 12 and 13.

Such pins 75 when not in use to lock the section may be conveniently stowed at the sides of the section. This is indicated in Fig. 16, with reference to the section 28, as by passing its headed pin 75 in the ear 76 and an opening in the indicated bracket 77.

Bumpers 78 are provided at the end or ends of the hatch opening at which the cover sections are stowed, as appears in Figs. 1, 12 and 13.

The hinged covers 80, 80 at the opposite sides of each cover section are provided for the purpose of closing the gaps between the sides of the cover section, such as the sides 28b, 28b, see Fig. 14 with respect to the cover section 28, and Fig. 11 with respect to the cover section 30, to thereby provide a substantial closure of the hatch opening in protection of the cargo; also to avoid any accidental stepping into such gap or gaps by the crew or other person, etc.

The hinged covers 80, 80 of each cover section are in their gap-closing position when the cover section is in its horizontal position. When it is desired to shift the cover section to its stowed position, preliminary to which the cover section is brought to support on its wheels, its hinged covers 80, 80 are swung open; upon the cover section attaining the end of the hatch opening at which it is to be stowed, the end portion of the cover section in which its bolts are located is pushed downward to thereby elevate the end portion of the cover section in which its overhang extensions are located, the accomplishment of such downward movement of the bolt-embracing end portion being afforded by the inward displacements of the rollers 67, 67 (of the overhang extensions 62, 62) to be free of their limit-stop rails 68, 68, as indicated in Fig. 17, and described hereinabove.

Figure 20:
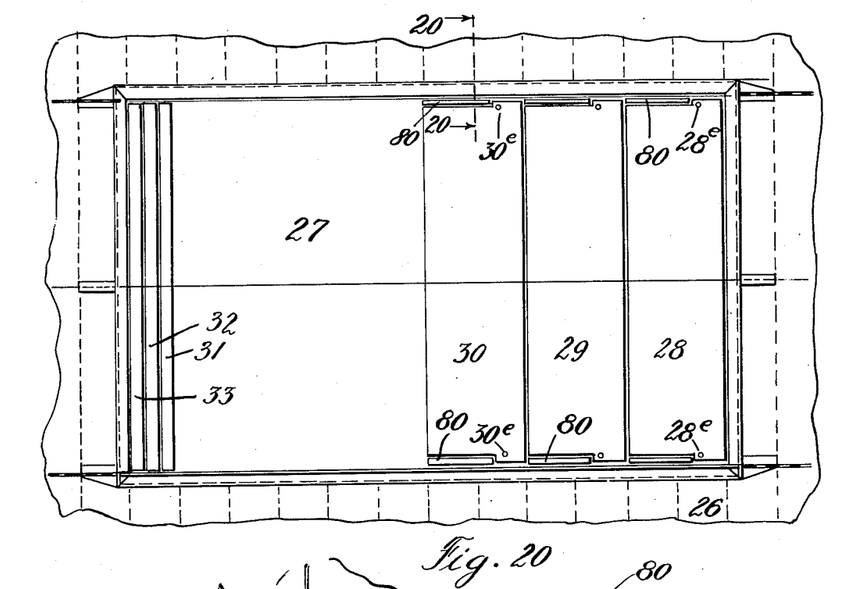
Fig. 20 is a top plan view of an embodiment of the invention as installed on a weather deck hatch. Three cover sections are shown vertically stowed, say at the aft end of the indicated hatch opening, and three sections in normal closing position adjacent the forward end of the hatch opening.
Figures 21, 22:
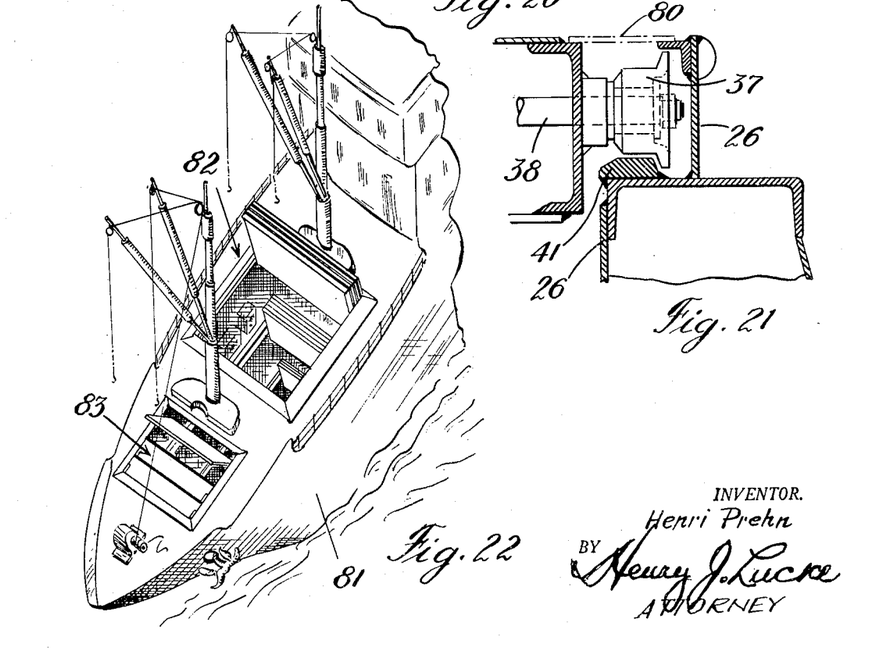
Fig. 21 is a detail sectional view corresponding to Fig. 15, but indicating the embodiment as installed in a weather deck hatch.
Fig. 22 is a detail top perspective view, largely diagrammatic, of the forward end of a ship. Two weather deck hatch openings are indicated: the cover sections of the hatch opening adjacent the bow of the ship is shown at a stage of partial opening of its cover sections; the cover sections of the other hatch opening are shown all stowed at the aft end of the opening, in vertical face-to-face position.

Figs. 20 and 21 illustrate the installation of cover sections, pursuant to the invention, in a weather deck hatch. Such arrangement corresponds generally to the arrangement illustrated and described as above set out with reference to a 'tween deck hatch. The relatively higher coaming 26 of weather deck hatch is indicated in Fig. 21.

The diagrammatic illustration, Fig. 22, depicts a conventional cargo ship 81 equipped with two weather deck hatch openings 82, 83. The cover sections of the hatch 82 are shown all stowed at its aft end. The cover sections of the hatch 83 are indicated at a stage of partial opening of its cover sections.

Reference to Figs. 2 and 3 shows the dot-and-dash outline 84 which indicates the height to which cargo on the lower deck may be stowed. Such increased potential of high stowage capacity of a ship is attained by structural and functional features afforded by the invention. It will be noted that the higher horizontal line portion of the outline 84 closely approximates the level of the lower faces of the cover sections, which is afforded by the restricted tilt of the sections to and from their closing positions in their transit along the track rails.

Other fundamental advantages reside in the facility of shifting the cover sections (necessarily of heavy weight imposed by the requirements of hatch covers) by manual operation, if necessary, the safety of the ship's crew in the course of such operation, and other advantages, as will be apparent to those skilled in the art.

I claim:

1. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocablly carried by the cover sections for supporting the cover sections in stable relation to said track rails.

2. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocably carried individually by the cover section for supporting the cover sections in stable relation to said track rails.

3. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocably carried by the cover sections for supporting the cover sections in stable relation to said track rails, said stable supporting means when in operation serving to elevate the cover sections with respect to the track rails.

4. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocably carried individually by the cover sections for supporting the cover sections in stable relation to said track rails, said stable supporting means when in operation serving to elevate the cover sections with respect to the track rails.

5. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocably carried individually by the cover sections for supporting the cover sections in stable relation to said track rails, said stable supporting means including elements in substantial mutual alignment mounted on each cover section.

6. Stowable cover means for a hatch opening of a ship, comprising a plurality of sections serving when arranged in edge-to-edge seriatim engagement as a cover for such hatch opening; a pair of wheels for each cover section; means for mounting said wheels, one at each side, in substantial alignment with one another in a vertical plane disposed closely adjacent the effective center of mass of the respective cover sections; track rails extending toward the ends of the hatch for the transit support of said wheels of the cover sections; means for mounting said track rails within the opening of the hatch; and means reciprocably carried individually by the cover sections for supporting the cover sections in stable relation to said track rails, said stable supporting means including reciprocable elements in substantial mutual alignment mounted on each cover section.

7. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; a pair of wheels for each cover section; means for mounting said wheels, one at each side adjacent said track rails, in substantial alignment with one another in a vertical plane disposed closely adjacent the effective center of mass of the respective cover sections; and means reciprocably carried individually by the cover sections for supporting the cover sections in stable relation to said track rails, said stable supporting means including reciprocable elements in substantial mutual alignment mounted on each cover section to be displaced and projected toward said track rails; and means carried by the section and co-acting with said track rails for limiting the extent of tilt of the section.

8. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; a pair of wheels for each cover section; means for mounting said wheels, one at each side adjacent said track rails, in substantial alignment with one another in a vertical plane disposed closely adjacent the effective center of mass of the respective cover sections; means reciprocably carried individually by the cover sections for supporting the cover sections in stable relation to said track rails, said stable supporting means including reciprocable elements in substantial mutual alignment mounted on each cover section to be displaced and projected toward said track rails; and roller means carried by the cover section and cooperating with the coaming to limit the extent of tilt of the section.

9. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; a pair of wheels for each cover section; means for mounting said wheels, one at each side adjacent said track rails, in substantial alignment with one another in a vertical plane disposed closely adjacent the effective center of mass of the respective cover sections; means carried individually by the cover sections for supporting the cover sections in stable relation to said track rails, said stable supporting means including reciprocable elements in substantial mutual alignment mounted on each cover section to be displaced and projected toward said track rails; said stable supporting means including means other than said reciprocable elements for effecting overweighting of the cover section; and means carried by the cover section for limiting the extent of tilt of the cover section.

10. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; means carried individually by the cover sections for supporting the cover sections in stable relation to said track rails, said stable supporting means including reciprocable elements in substantial mutual alignment mounted on each cover section, said stable supporting means including means other than said reciprocable elements for effecting overweighting of the cover section; and means including rollers carried by the section and disposed opposite of said reciprocable elements relative to the center of mass of the section for limiting the extent of tilt of the section.

11. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; means carried by the cover sections for supporting the cover sections in stable relation to said track rails, elements reciprocably carried by the section serving to support the section and effecting elevation of said wheels relative to said track rails; and means carried by the section cooperating with said reciprocable elements in such support of the section.

12. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; and reciprocable means carried by the cover sections for supporting the cover sections in stable relation to said track rails, said supporting means including reciprocable elements individually supported by the cover section and serving to elevate the cover section by engagement with said track rails, said supporting means further including means carried by the section and disposed to engage said track rails when said wheels are in elevated position.

13. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; and individually reciprocable means carried by the cover sections for supporting the cover sections in stable relation to said track rails, said supporting means including both means projectedly carried by the cover section and serving when projected to engage said track rails to elevate the wheels of the cover section, said supporting means further including means carried by the cover section and disposed to engage said track rails upon engagement of said bolt means with said track rails.

14. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; means carried individually by the cover sections for supporting the cover sections in stable relation to said track rails, said stable supporting means including reciprocable elements in substantial mutual alignment mounted on each cover section for engagement with said track rails, said supporting means further including plate means carried by the cover section and disposed to engage said track rails upon engagement of said reciprocable elements with said track rails, said plate means being distributedly mounted on each cover section to effect closure of the cover section when supported by its wheels; and means carried by the cover section for limiting the extent of tilt of the cover section.

15. Stowable cover means for a hatch opening of a ship, comprising a plurality of sections serving when arranged in edge-to-edge seriatim engagement as a cover for such hatch opening; track rails extending toward the ends of the hatch for the transit support of the cover sections; means for mounting said track rails respectively within the opening of the hatch; a pair of wheels for each cover section; means for mounting said wheels, one at each side adjacent said track rails, in substantial alignment with one another in a vertical plane disposed closely adjacent the effective center of mass of the respective cover sections; means including bolt means carried individually by the cover sections for supporting the cover sections in stable relation to said track rails, said cover section supporting means including plate means distributedly mounted on each cover section to effect overweighting of the cover section when supported by its said wheels.

16. A cover section for a hatch opening of a ship, comprising a hollow formed body; shaft means mounted in said hollow body and at opposite sides thereof; a wheel respectively carried by said shaft means, the axes of said wheels being in substantial alignment; bolt means carried by said cover section; and means for reciprocally mounting said bolt means with respect to the cover section to project beyond the contour of the cover section to serve as a support for the cover section in stable relation in substitution of support of the cover section by its said wheels, and when in non-supporting relation to be withdrawn within the contour of the cover section; the axes of said wheels being disposed in a plane closely adjacent the vertical plane passing through the effective center of mass of the cover section.

17. A cover section for a hatch opening of a ship, comprising a hollow formed body; shaft means mounted in said hollow body and at opposite sides thereof; a wheel respectively carried by said shaft means, the axes of said wheels being in substantial alignment; bolt means carried by said cover section; means for reciprocally mounting said bolt means with respect to the cover section to project beyond the contour of the cover section to serve as a support for the cover section in stable relation in substitution of support of the cover section by its said wheels, and when in non-supporting relation to be withdrawn within the contour of the cover section; the axes of said wheels being disposed in a plane closely adjacent the vertical plane passing through the effective center of mass of the cover section; and elements in substantial mutual alignment disposed adjacent the opposite end portion of the cover section cooperating with said bolt means when in projected position, to support the cover section in stable relation with the body of the ship.

18. A cover section for a hatch opening of a ship, comprising a hollow formed body; shaft means mounted in said hollow body and at opposite sides thereof; a wheel respectively carried by said shaft means, the axes of said wheels being in substantial alignment; bolt means carried by said cover section; means for reciprocally mounting said bolt means with respect to the cover section to project beyond the contour of the cover section to serve as a support for the cover section in stable relation in substitution of support of the cover section by its said wheels, and when in non-supporting relation to be withdrawn within the contour of the cover section; the axes of said wheels being disposed in a plane closely adjacent the vertical plane passing through the effective center of mass of the cover section; and elements in substantial mutual alignment carried by the cover section and disposed remotely relative to said bolt means and cooperating with said bolt means when in projected position to support the cover section, the aforesaid elements being distributedly mounted on the cover section to effect overweighting of the cover section when supported by its wheels.

19. A cover section for a hatch opening of a ship, comprising a hollow formed body; a pair of shafts respectively mounted in said hollow body and at opposite sides thereof; wheels respectively mounted on said shafts, the axes of said wheels being in substantial alignment and disposed in a plane closely adjacent the vertical plane passing through the effective center of mass of the cover section; bolt means carried by the cover section; means for reciprocably displacing said bolt means to project beyond the contour of the cover section at said opposite sides; elements in substantial mutual alignment carried by the cover section and respectively remotely disposed relative to said bolt means, said elements serving cooperatively with said bolt means to support the cover section in substitution of the support of the cover section by its said wheels, the aforesaid elements being distributedly mounted on the cover section to effect closure of the cover section when supported by its wheels; and roller means carried by the cover section serving to limit the extent of tilt of the cover section when supported by its said wheels.

20. A cover section for a hatch opening of a ship, comprising a hollow formed body; a pair of shafts respectively mounted in said hollow body and at opposite sides thereof; wheels respectively mounted on said shafts, the axes of said wheels being in substantial alignment and disposed in a plane closely adjacent the vertical plane passing through the effective center of mass of the cover section; bolt means carried by the cover section; means for reciprocably displacing said bolt means to project beyond the contour of the cover section at said opposite sides; elements in substantial mutual alignment carried by the cover section and respectively remotely disposed relative to said bolt means, said elements serving cooperatively with said bolt means to support the cover section in substitution of the support of the cover section by its said wheels, the aforesaid elements being distributedly mounted on the cover section to effect overweighting of the cover section at its end opposite said bolt means; and roller means carried by the cover section serving to limit the extent of tilt of the cover section when supported by its said wheels.

21. A hatch cover comprising a body, shoes, protruding from opposite sides of said body, and adapted to support the cover pivotally within a hatchway and to facilitate horizontal movement of the cover relatively to the hatchway, and extensible guide means on at least one of such opposite sides spaced from said shoes and adapted, when extended, to coact with adjacent portions of a hatchway whereby to restrain the cover against movement other than non-angular horizontal movement.

22. A hatch cover comprising a body, means protruding from opposite sides of said body for supporting the cover pivotally within a hatchway, and to facilitate rotational movement and horizontal movement of the cover relatively to the hatchway, means for locking the cover against any such movements, and means for guiding the cover, in such horizontal movement, whereby to prevent jamming of the cover in the hatchway, the said locking and guiding means being extensible from the cover for so locking and guiding the latter and retractable to permit such pivotal movement.

23. A hatch cover comprising a body, supporting means protruding from opposite sides of said body, for supporting the cover pivotally, and locking means for locking said body against pivotal movement and constituting second supporting means, said locking means comprising one or more bolts adapted for extension into engagement with a hatch portion to lock the cover in horizontal position and against pivotal movement, the said bolts each having an inclined surface on its underside, adapted, in its said extension movement, to coact with a hatch portion, when the cover is in horizontal position, to wedge the cover upwardly sufficiently to relieve the said first-mentioned supporting means of the weight of the cover.

HENRI PREHN.

REFERENCES CITED

The following references are of record in the file of this patent:

UNITED STATES PATENTS

| Number | Name | Date |
|---|---|---|
| 1,158,946 | McGray | Nov. 2, 1915 |
| 1,735,329 | MacGregor | Nov. 12, 1929 |

FOREIGN PATENTS

| Number | Country | Date |
|---|---|---|
| 364,474 | Great Britain | Jan. 7, 1932 |
| 383,082 | Great Britain | Nov. 10, 1932 |